United States Patent [19]
Sahara et al.

[11] Patent Number: 5,568,463
[45] Date of Patent: Oct. 22, 1996

[54] SEMICONDUCTOR LASER DEVICE TO DETECT A DIVIDED REFLECTED LIGHT BEAM

[75] Inventors: Kenji Sahara; Hironobu Narui; Masato Doi; Osamu Matsuda, all of Kanagawa, Japan

[73] Assignee: Sony Corporation, Tokyo, Japan

[21] Appl. No.: 399,642

[22] Filed: Mar. 7, 1995

[30] Foreign Application Priority Data

Mar. 8, 1994 [JP] Japan .................................. 6-037255

[51] Int. Cl.$^6$ ...................................................... G11B 7/13
[52] U.S. Cl. .......................... 369/112; 369/13; 369/122; 369/44.23
[58] Field of Search ........................ 369/112, 121, 369/122, 13, 44.23

[56] References Cited

U.S. PATENT DOCUMENTS

| | | | |
|---|---|---|---|
| 5,052,005 | 9/1991 | Tanaka et al. | 369/122 |
| 5,111,449 | 5/1992 | Kurata et al. | 369/122 |
| 5,119,352 | 6/1992 | Bell, Jr. | 369/13 |
| 5,136,152 | 8/1992 | Lee | 369/112 |
| 5,161,148 | 11/1992 | Hori et al. | 369/122 |
| 5,327,415 | 7/1994 | Vettiger et al. | 369/121 |
| 5,481,524 | 1/1996 | Ueno et al. | 369/112 |

FOREIGN PATENT DOCUMENTS

| | | |
|---|---|---|
| 0325104A3 | 7/1989 | European Pat. Off. . |
| 0555097A1 | 8/1993 | European Pat. Off. . |
| 0563484A1 | 10/1993 | European Pat. Off. . |
| 0579843A1 | 1/1994 | European Pat. Off. . |
| WO93/16469 | 8/1993 | WIPO . |

OTHER PUBLICATIONS

Ophey, W. G., "Compact Optical Light Paths", Jul. 5–9, 1993, pp. 12–13, *Joint International Symposium on Optical Memory and Optical Data Storage 1993*.

Primary Examiner—Georgia Y. Epps
Assistant Examiner—Kim-Kwok Chu

[57] ABSTRACT

An optical device for detecting a magneto-optical signal can be simplified and miniaturized in arrangement. An optical device for detecting a magneto-optical signal includes an optical element in which a light-emitting portion and a light receiving portion are closely disposed on a common substrate and in which reflected-back light obtained from a magneto-optical medium after light from the light-emitting portion was reflected on the magneto-optical medium is detected at a position near confocal position by the light receiving portion and another light receiving element. The reflected-back light from the magneto-optical medium is divided. One reflected-back light is detected by the light receiving portion of the optical element 1 and the other reflected-back light is detected by another light receiving element.

3 Claims, 12 Drawing Sheets

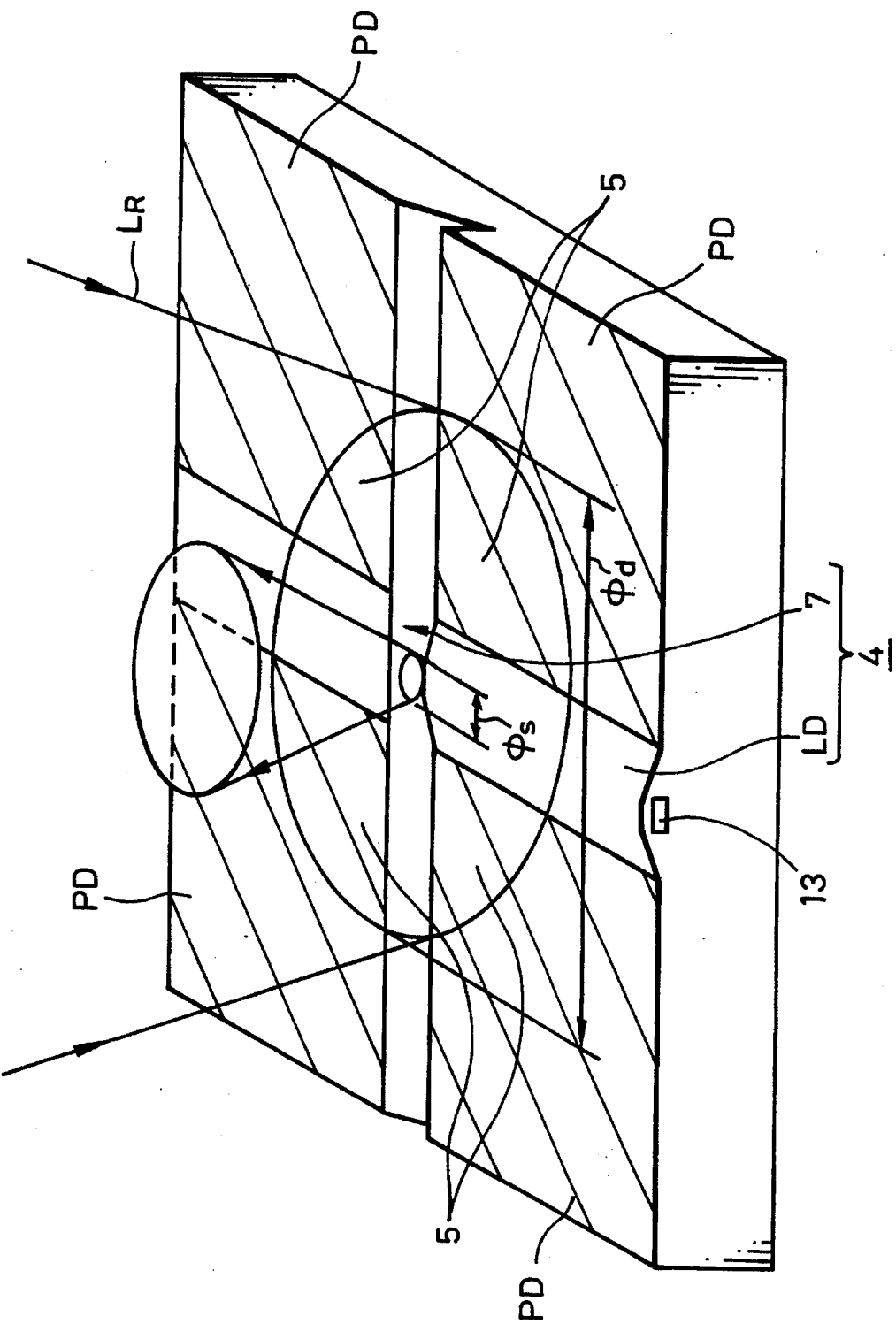

SEMICONDUCTOR LASER DEVICE TO DETECT A DIVIDED REFLECTED LIGHT BEAM

BACKGROUND OF THE INVENTION

The present invention relates to an optical device for detecting a magneto-optical signal and, more particularly, is directed to an optical device including a novel optical element.

In an optical device, such as a magneto-optical pickup unit of a so-called magneto-optical disc drive, optical parts are assembled in a hybrid fashion by using polarizing elements, such as a Wollaston prism, a polarizing beam splitter (PBS) or the like. Therefore, the overall arrangement of the magneto-optical pickup becomes complicated and large. Moreover, optical parts of the optical device have to be optically disposed with high alignment accuracy.

In addition, each of the optical elements is expensive and therefore it is not so easy to provide an inexpensive magneto-optical pickup.

OBJECTS AND SUMMARY OF THE INVENTION

It is therefore an object of the present invention to provide an optical device for detecting a magneto-optical signal in which the number of optical parts can be reduced.

It is another object of the present invention to provide an optical device for detecting a magneto-optical signal in which optical parts can easily be disposed with high alignment accuracy.

It is a further object of the present invention to provide an optical device for detecting a magneto-optical signal in which an overall arrangement of the optical device can be simplified and miniaturized.

It is yet a further object of the present invention to provide an inexpensive optical device for detecting a magneto-optical signal.

According to an aspect of the present invention, there is provided an optical device for detecting a magneto-optical signal which is comprised of an optical element having a common substrate, a light-emitting portion and a light receiving portion, the light-emitting portion and the light receiving portion being closely disposed on the common substrate and the light receiving portion receiving and detecting reflected-back light obtained from a magneto-optical medium after light emitted from the light-emitting portion was reflected on the magneto-optical medium, and another light receiving element, wherein the reflected-back light from the magneto-optical medium is divided, one reflected-back light is received and detected by the light receiving portion of the optical element and the other reflected-back light is received and detected by the another light receiving element.

BRIEF DESCRIPTION OF THE DRAWINGS

FIG. 9 is a schematic perspective view showing a further example of an optical element used in the present invention;

DETAILED DESCRIPTION OF THE PREFERRED EMBODIMENTS

An optical device according to the embodiments of the present invention will be described in detail with reference to the drawings.

Initially, an optical element used in the optical device according to the present invention will be described with reference to FIGS. 1 through 9.

Figure 1:
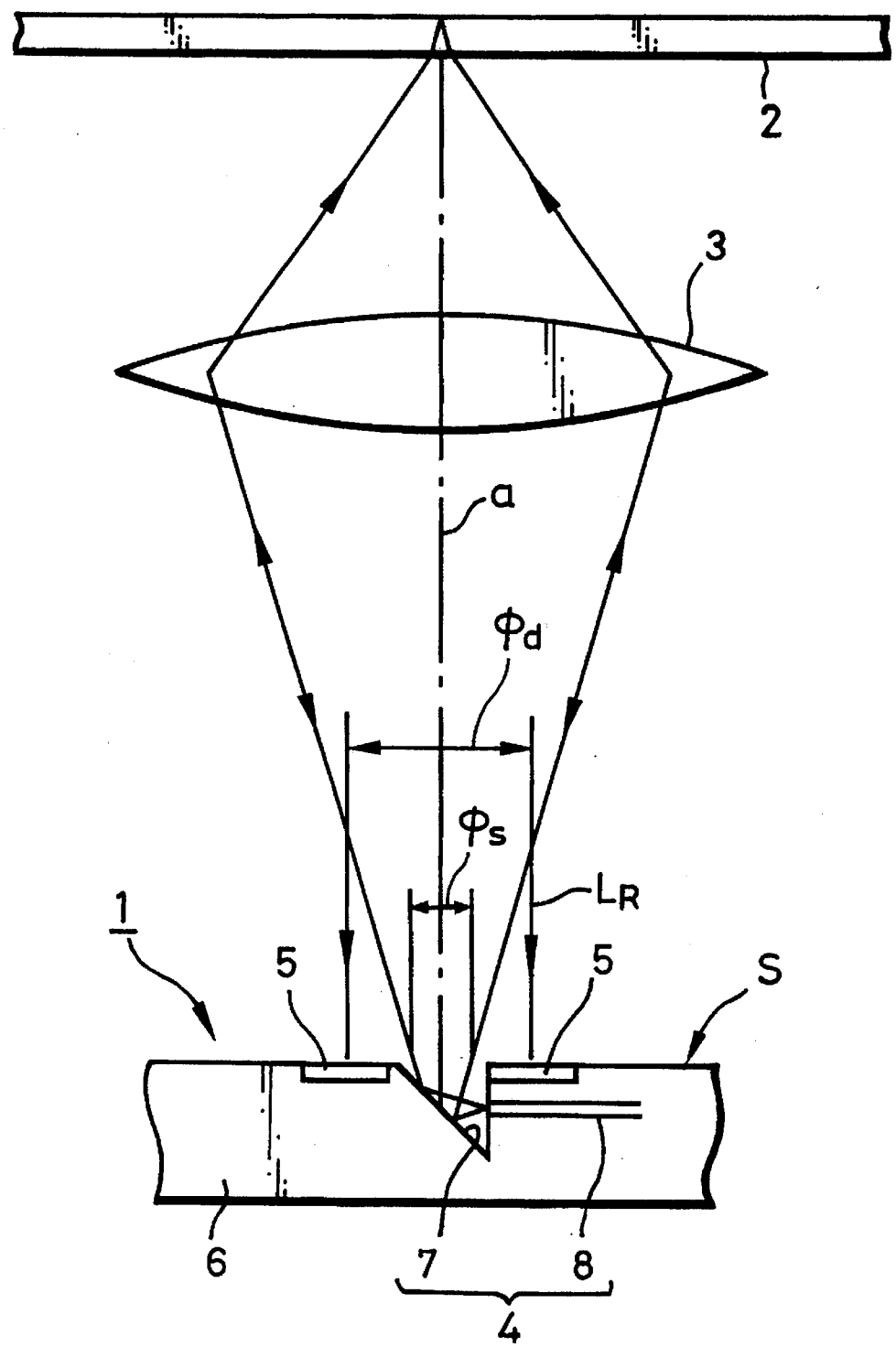
FIG. 1 is a schematic diagram useful for explaining an optical element used in the present invention.

In FIG. 1, reference numeral 1 depicts an optical element, 2 an irradiated portion, such as an optical recording medium or the like, and 3 a converging means, i.e., a condenser optical lens.

The optical element 1 comprises a light-emitting portion 4 and a light receiving portion 5 both of which are formed on a common substrate 6. Light emitted from the light-emitting portion 4 is converged and irradiated on the irradiated portion 2. Light (i.e., reflected-back light) reflected on the irradiated portion 2 is converged by the converging means 3 and received by the light receiving portion 5 disposed at the position near a confocal of the converging means 3. According to the above-mentioned arrangement, outward light and inward light of light emitted from the light-emitting portion 4 are traveled through coaxial optical paths and received by the light receiving portion 5 while the optical axis of light is shown by a one-dot chain line a in FIG. 1.

In this optical element 1, the light-emitting portion 4 is composed of a semiconductor laser 8 and a reflection mirror 7. The light receiving portion 5 is formed of a photodiode (PD). The semiconductor laser 8 uses the reflection mirror 7 to reflect emitted light so that the emitted light is agreed with the optical path through which the emitted light can travel toward the irradiated portion 2.

Reflected-back light $L_R$ traveling toward the light receiving portion 5 is converged up to near a light diffraction limit. The light receiving portion 5 is disposed such that at least a part of the light receiving surface thereof is placed within this light diffraction limit, i.e., a part of the light receiving surface thereof is placed at the position at which a distance of light passing through a disposing reference plane S of the light receiving surface after light was emitted from the light-emitting portion 4 from the optical axis a falls within 1.22 λ/NA where λ is the wavelength of light emitted from the light-emitting portion 4 and NA is the numerical aperture of the converging means 3.

Figure 2:
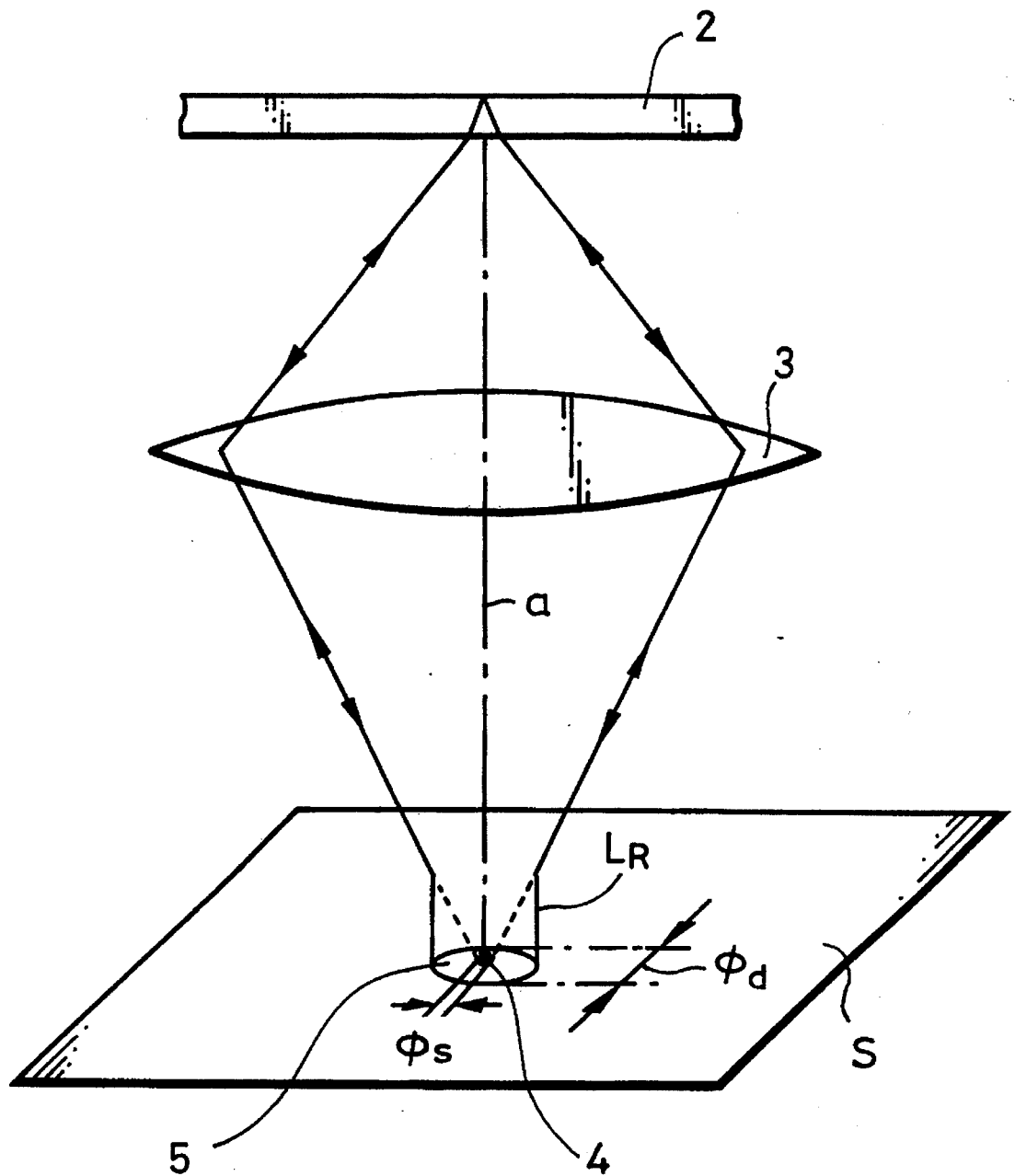
FIG. 2 is a schematic diagram used to explain a fundamental arrangement of the optical element used in the present invention.

Moreover, in this case, as shown in FIGS. 1 and 2, a diameter $\phi_s$ of light emitted from the light-emitting portion 4 on the disposing reference plane S of the light receiving surface of the light receiving portion 5 is smaller than a diameter $\phi_d$ of the light diffraction limit so that the effective light receiving surface of the light receiving portion 5 is placed outside the diameter $\phi_s$ of the light thus emitted. If a semiconductor laser is used as a light source of the light-emitting portion 4, then the diameter $\phi_s$ of the emitted light can range from about 1 to 2 µm. If on the other hand the numerical aperture NA of the converging means 3 ranges from 0.09 to 0.1 and the wavelength λ of the emitted light is about 780 nm, then the diffraction limit, i.e., $\phi_d$ becomes about 1.22 λ/NA+10 µm.

Then, the light-emitting portion 4 is disposed at the focal position of the converging means 3. To be more concrete, a so-called waist of light emitted from the semiconductor laser 8 is placed at the confocal position. The irradiated portion 2 is placed at the position of the other focal of the converging means 3.

In this optical element 1, if the light emitted from the light-emitting portion 4 is irradiated on the optical recording medium of the irradiated portion 2 disposed at the confocal position through the converging means 3, i.e., the condenser optical lens, then reflected-back light of light reflected from the irradiated portion 2 of the optical recording medium, i.e., reflected-back light including recorded information is converged again by the converging means 3 and introduced into the photodiode of the light receiving portion 5 disposed near the confocal position. This reflected-back light is received and detected by the light receiving portion 5, i.e., converted into an electrical signal and then output as a reproduced signal.

At that time, if the light receiving surface of the photodiode of the light receiving portion 5 is placed at the position including a region in which a distance from the optical axis a is greater than $\phi_s/2$ and lies within $\phi_d/2$, then it becomes possible to reliably separate and detect the reflected-back light from the irradiated portion 2 and the emitted light by the light receiving portion 4.

If this optical element 1 has the structure such that the light-emitting portion 4 and the light receiving portion 5 are integrally formed on the common substrate 6 as described above, then it is possible to easily and reliably set the light-emitting portion 4 and the light receiving portion 5 with a predetermined positional relationship satisfactorily.

A typical example of a method of manufacturing the optical element 1 will be described below. In this example, the optical element 1 is manufactured by a selective MOCVD (metal organic chemical vapor deposition).

Figure 3A:
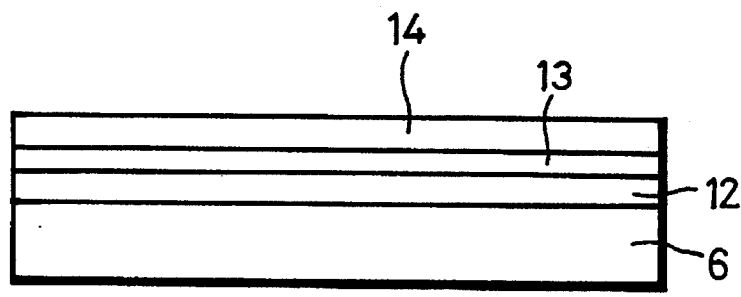
FIGS. 3A through 3C are process diagrams showing a first process of an example of a method of manufacturing an optical element used in the present invention, respectively.

As shown in FIG. 3A, semiconductor layers forming a semiconductor laser are epitaxially grown on the substrate 6 formed of a GaAs substrate of a first conductivity type, i.e., n-type having (100) crystal plane as a major surface. Specifically, there is formed a laminated semiconductor layer in which an AlGaAs first cladding layer 12 of the same conductivity type as that of the GaAs substrate 6, a GaAs active layer 13 and an AlGaAs second cladding layer 14 of a second conductivity type different from the conductivity type of the first cladding layer 12 of, for example, p type are epitaxially grown on the GaAs substrate 6, in that order.

Figure 3B:
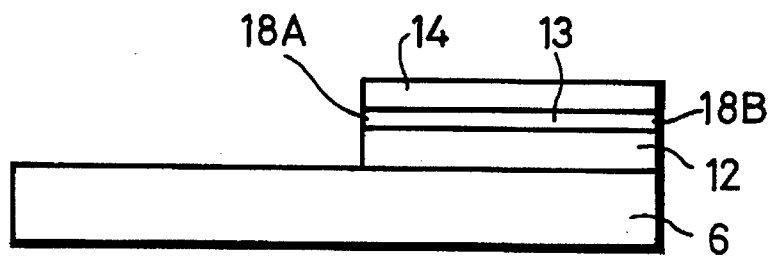

Then, as shown in FIG. 3B, the semiconductor layers 14, 13 and 12 thus epitaxially grown on the GaAs substrate 6 are left as a semiconductor laser LD and removed at their portions where a reflection mirror 7 is finally formed by etching, such as RIE (reactive ion etching) or the like. An end face of the semiconductor layer formed by the etching surface is employed as one resonator end face 18A of the semiconductor laser LD. A surface opposing the end face 18A is formed as the other resonator end face 18B by RIE. A horizontal resonator of a semiconductor laser is constructed between the two end faces 18A and 18B. In this case, though not shown, current blocking regions are formed by implanting impurity ions so as to sandwich a region which finally constructs the resonator of the semiconductor laser.

Figure 3C:
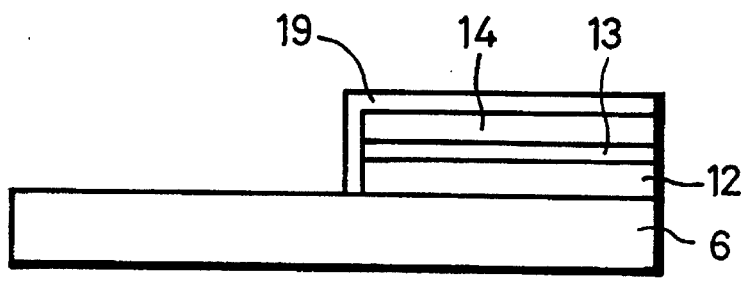

As shown in FIG. 3C, a mask layer 19 for selective MOCVD, e.g., an insulating layer of $SiO_2$, SiN or the like is deposited so as to cover the laminated semiconductor layer left on the substrate 6, i.e., the portion in which the semiconductor laser LD is formed.

Figure 4A:
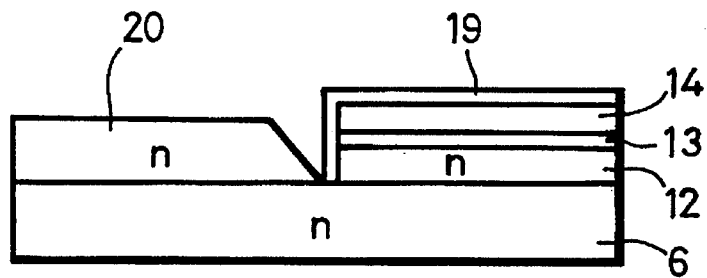
FIGS. 4A through 4C are process diagram showing a second process of an example of a method of manufacturing an optical element used in the present invention, respectively.

As shown in FIG. 4A, a first conductivity type, e.g., n-type GaAs first semiconductor layer 20 is selectively formed on the substrate 6 at its portion which is not covered with the mask layer 19 by MOCVD.

Figure 4B:
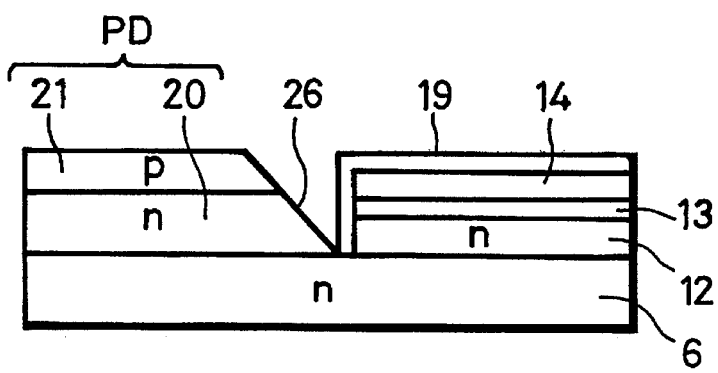

Subsequently, as shown in FIG. 4B, a second conductivity type, e.g., p-type GaAs second semiconductor layer 21 is selectively formed on the first semiconductor layer 20 by MOCVD. The first and second semiconductor layers 20 and 21 constitute a photodiode PD.

Figure 4C:
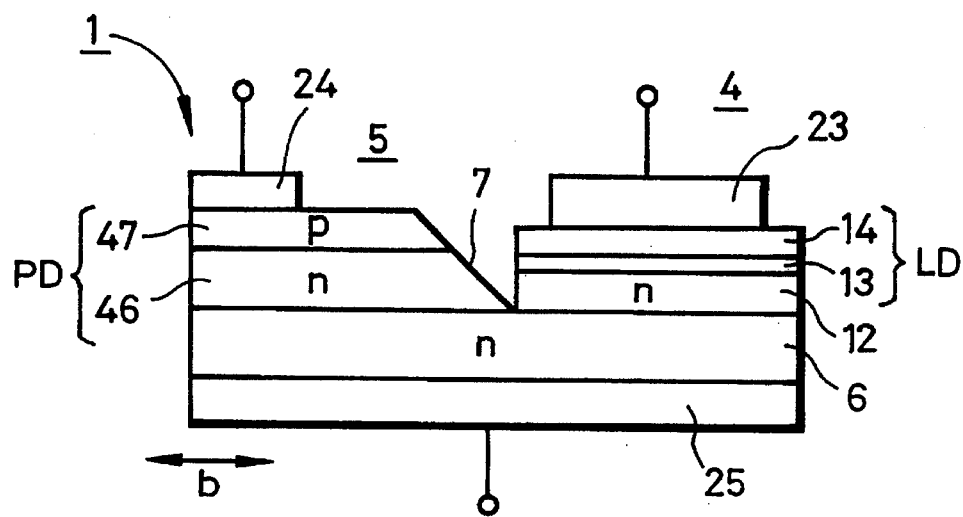

As shown in FIG. 4C, the mask layer 19 is removed by etching. Electrodes 23 and 24 of the semiconductor laser LD and the photodiode PD are deposited on a part of the semiconductor laser LD and the second semiconductor layer 20 in an ohmic contact fashion. A common electrode 25 is deposited on the rear surface of the substrate 6 in an ohmic contact fashion.

In this case, a plane 26 formed on the semiconductor layer that was selectively and epitaxially grown on the substrate 6 of FIG. 4B, i.e., the first and second semiconductor layers 20 and 21 in an opposing relation to the resonator end face 18A becomes a specified crystal plane. For example, if the resonator length direction of the horizontal resonator of the semiconductor laser formed between the end faces 18A and 18B of the semiconductor laser, i.e., the direction shown by an arrow b in FIG. 4C is set to [011] crystal axis direction, then the opposing plane 26 is produced as an inclined plane of {111}A. If the direction b is set to [0–11] crystal axis direction, then the opposing plane 26 is produced as an inclined plane {111}B. In any cases, an angle formed by the inclined plane and the plate surface of the substrate 6 becomes 54.7°. If the direction b is set to [100] crystal axis direction, then the opposing plane 26 is produced as an inclined plane {110} and forms an angle of 45° with respect to the plate surface of the substrate 6. In any cases, the crystal plane is formed as the inclined plane 26 of atomic plane with satisfactory morphology.

Therefore, the inclined plane 26 formed of the specified crystal plane can be served as the reflection mirror 7 which can reflect light emitted from the end face 18A of the horizontal resonator of the semiconductor laser so that the emitted light travels in a predetermined direction. According to the above-mentioned arrangement, since the reflection mirror 7 is formed by the crystal plane, the reflection mirror 7 is excellent in mirror finished surface property and the inclination angle thereof can be set with high accuracy.

Figure 5A:
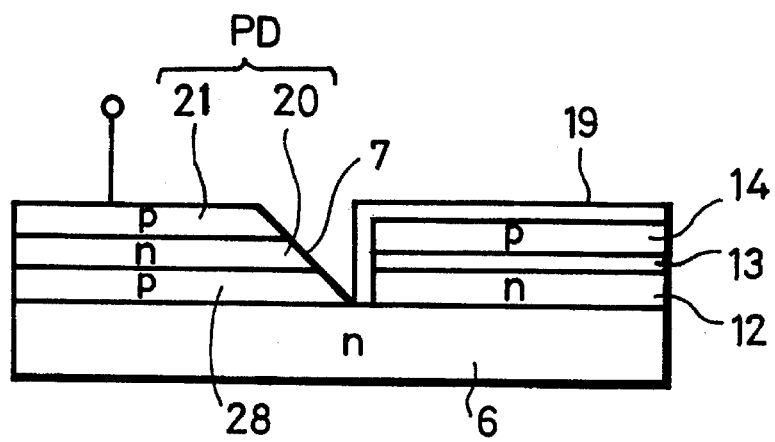
FIGS. 5A and 5B are process diagram showing a third process of an example of a method of manufacturing an optical element used in the present invention, respectively.
Figure 5B:
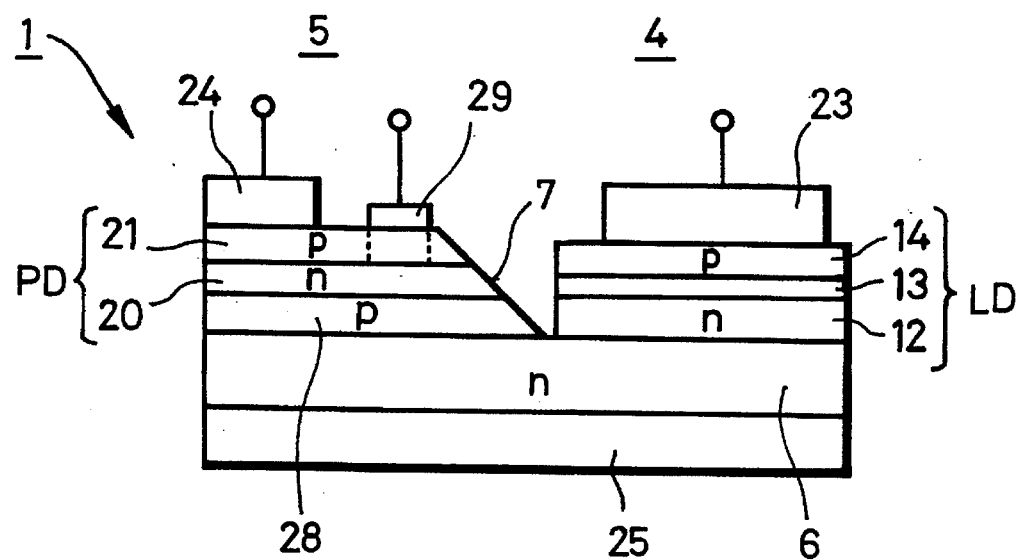

While the photodiode PD is composed of the semiconductor layer 20 of the same conductivity type as that of the substrate 6, i.e., n type and the different conductivity-type, i.e., p-type semiconductor layer 21 which are sequentially and epitaxially grown on the substrate 6 as shown in the examples of FIGS. 4A to 4C, the present invention is not limited thereto and the following variant is also possible. In order to reduce a crosstalk generated between the photodiode PD and the semiconductor laser LD, after the processes shown in FIGS. 3A to 3C were carried out, as shown in FIG. 5A, a semiconductor layer 28 of a second conductivity type different from that of the substrate 6, e.g., p-type is epitaxially grown on the substrate 6 before the semiconductor layers 20 and 21 are epitaxially grown on the substrate 6. Then, the semiconductor layers 20 and 21 forming the photodiode PD can be epitaxially grown on the substrate 6 through the p-type semiconductor layer 28. In this case, a part of the upper semiconductor layer 21 is removed to expose a part of the under semiconductor layer 20 to the outside by etching. Then, an electrode 29 is independently deposited on the exposed portion of the under semiconductor layer 20 in an ohmic fashion and two electrodes of the photodiode PD are led out independently. Thus, the semiconductor laser LD is separated by the semiconductor layer 28.

While the light-emitting portion 4 and the light receiving portion 5 are juxtaposed in the example of the optical element 1, the present invention is not limited thereto and the photodiode PD can be disposed on the light-emitting portion 4.

An example of the above-mentioned case will be described below together with an example of a manufacturing method thereof.

Figure 6A:
FIGS. 6A through 6C are process diagrams showing a first process of another example of a method of manufacturing an optical element used in the present invention, respectively.
Figure 6B:
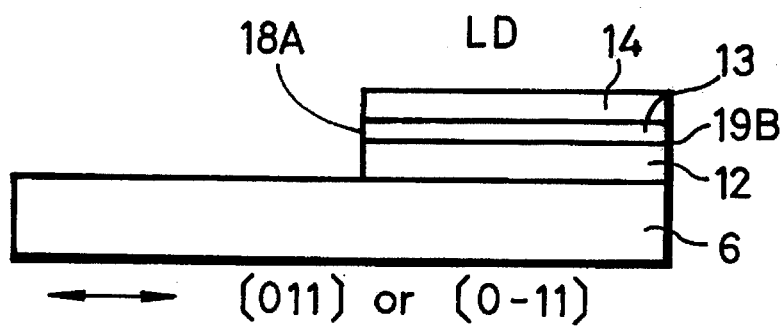

According to this example, as shown in FIGS. 6A and 6B, the semiconductor layers 12, 13 and 14 constructing the semiconductor laser are formed, the semiconductor layers 12, 13 and 14 are partly removed so as to leave the portion in which the semiconductor laser LD is formed and the current blocking region is formed similarly to FIGS. 3A and 3B.

Figure 6C:
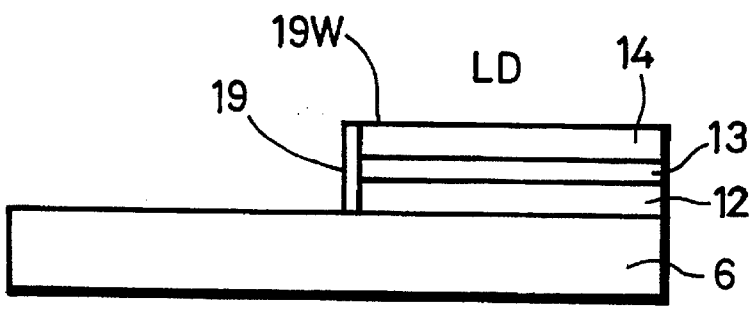

Thereafter, as shown in FIG. 6C, the mask layer 19 is formed on the end face 18A so as to form an opening 19W at least on a part of the semiconductor layer 14.

Figure 7A:
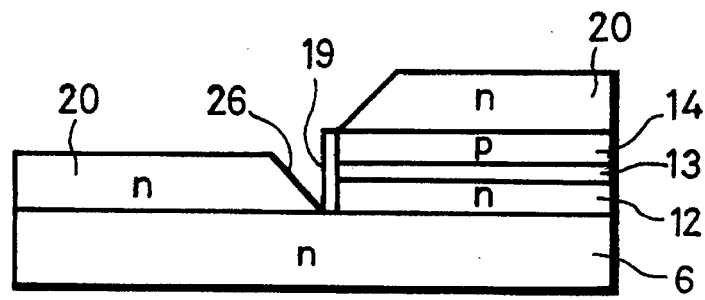
FIG. 7A through 7C are process diagrams showing a second process of another example of a method of manufacturing an optical element used in the present invention, respectively.
Figure 7B:
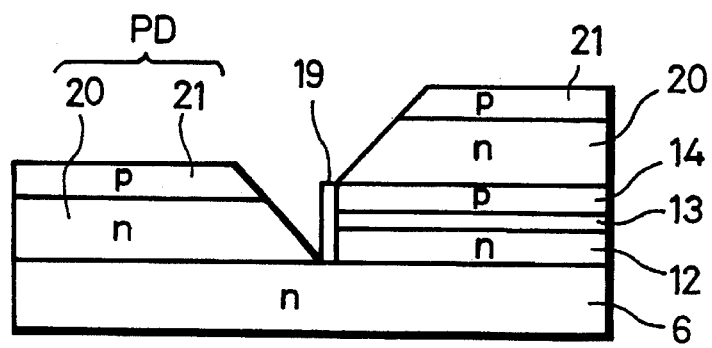
Figure 7C:
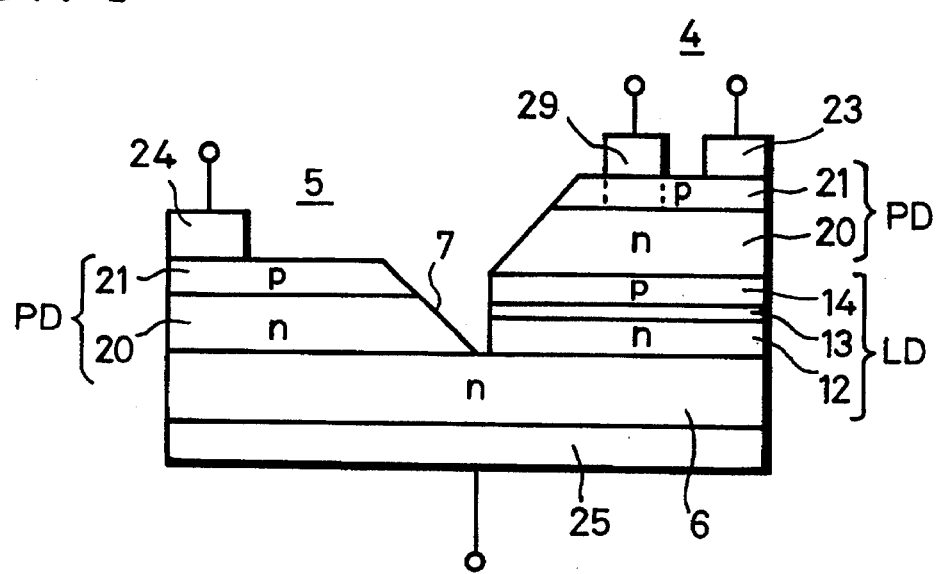

Then, as shown in FIGS. 7A, 7B and 7C, the semiconductor layers 20 and 21 are formed similarly to FIGS. 3A, 3B and 3C. At that time, the semiconductor layers 20 and 21 can be formed on the semiconductor laser LD, i.e., the semiconductor layer 14 through the opening 19W and therefore the photodiode PD can be formed.

Figure 8A:
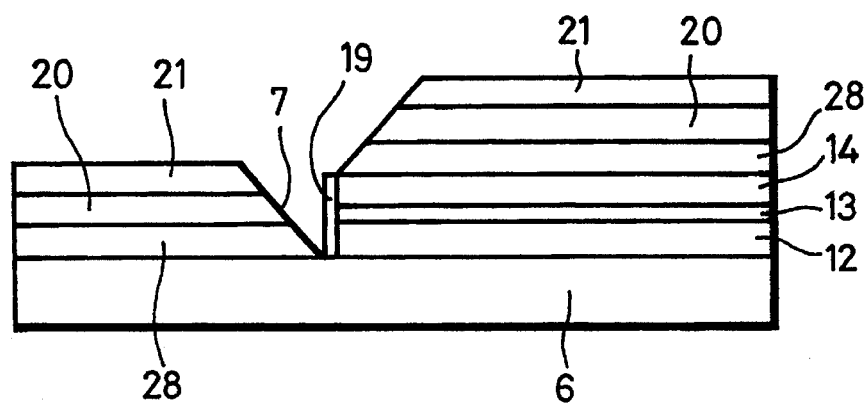
FIGS. 8A and 8B are process diagrams showing a third process of another example of a method of manufacturing an optical element used in the present invention, respectively.
Figure 8B:
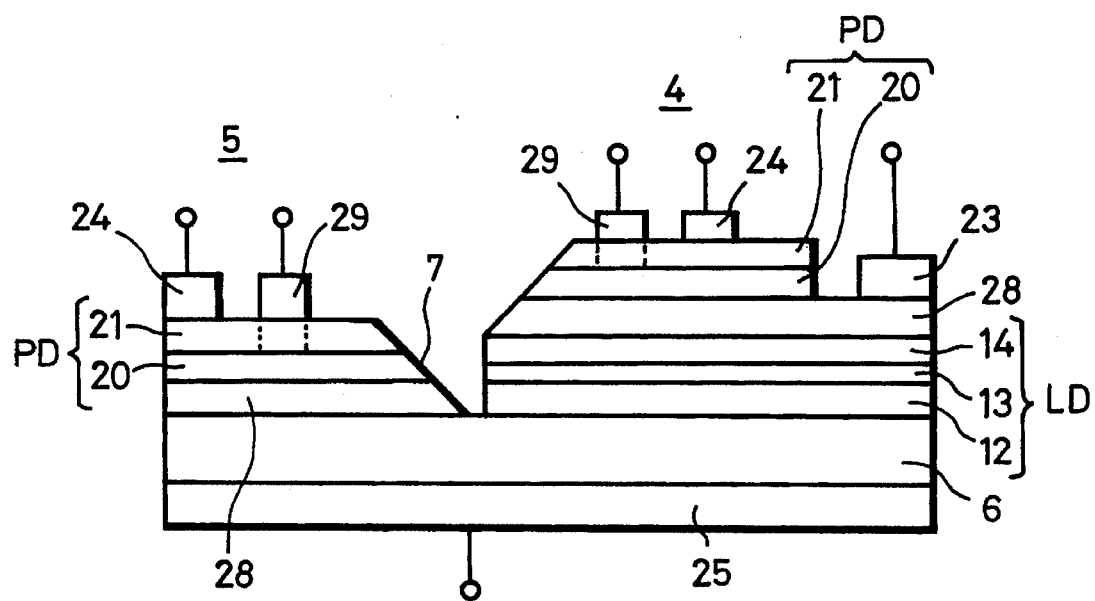

Also in this case, as shown in FIGS. 8A and 8B, after the processes shown in FIGS. 6A, 6B and 6C were executed, the semiconductor layers 20 and 21 forming the photodiode PD are epitaxially grown on the semiconductor laser LD through the semiconductor layer 28, thereby making it possible to form the photodiode PD on the semiconductor laser LD.

In FIGS. 6A to 6C through FIGS. 8A and 8B, elements and parts identical to those of FIGS. 3A to 3C through FIGS. 5A and 5B are marked with the same references and therefore need not be described in detail.

The above-mentioned selective MOCVD might be a methyl MOCVD using TMG (trimethyl gallium) as a gallium raw material gas and an ethyl MOCVD using TEG (triethyl gallium) as a gallium raw material gas. In the example of the optical element 1, if the semiconductor layers 20 and 21 forming the photodiode and the semiconductor layer 28 formed under the semiconductor layers 20, 21 are formed of GaAs layers, then these semiconductor layers 20, 21 and 28 can satisfactorily be formed by an atmospheric pressure MOCVD and a low pressure MOCVD. However, if at least any one of the semiconductor layers 20, 21 and 28 is formed of AlGaAs layer according to some requirements, then the semiconductor layer has to be epitaxially grown by the low pressure MOCVD.

The light-emitting portion 4 and the light receiving portion 5 can be variously modified in structure and layout. Further, it is needless to say that the conductivity types of the respective portions can be reversed.

While the semiconductor laser of the light-emitting portion is formed of the first and second cladding layers 12, 14 and the active layer 13 as described above, the present invention is not limited thereto and the following variant is also possible. That is, the semiconductor laser may include guide layers across the active layer or may include a capping layer formed on the second cladding layer. Further, as in a semiconductor laser described in Japanese laid-open patent publication No. 3-76218, it is possible to form a semiconductor laser of a so-called SDH (separate double heterojunction) structure. According to the SDH structure, a stripe ridge extending in the [011] direction is formed on a semiconductor substrate having a {100} crystal plane as a major surface. A {111} B plane whose growth rate in the upper oblique direction is low is crystallized on the ridge from its edge portion extended in the stripe direction by epitaxially growing a first cladding layer, an active layer, a second cladding layer or the like on the semiconductor substrate. Then, a semiconductor laser portion having a triangular cross section formed by laminating the first cladding layer, the active layer and the second cladding layer sandwiched by the inclined surface of the {111} B plane is separated from the epitaxially-grown semiconductor layer on the groove on both sides of the ridge of other portion.

Furthermore, while there can be provided the single photodiode PD as described above, the present invention is not limited thereto and it is possible to form a photodiode by a plurality of divided photodiode portions. FIG. 9 shows a schematic arrangement of such photodiode. As shown in FIG. 9, the semiconductor laser LD forming the light-emitting portion 4 is formed of the above ridge-shaped SDH structure. The reflection mirror 7 formed by the crystal plane shown in FIGS. 3A, 3B, 3C through FIGS. 8A, 8B is formed in an opposing relation to a light exit end face of the horizontal resonator formed of the active layer 13. Light emitted from the semiconductor laser LD is reflected by the reflection mirror 7 and traveled toward an irradiated portion (not shown). There are provided a plurality of, e.g., four divided photodiodes PD around the semiconductor laser LD.

An optical device according to the present invention is formed by using the above-mentioned optical element 1.

Figure 10:
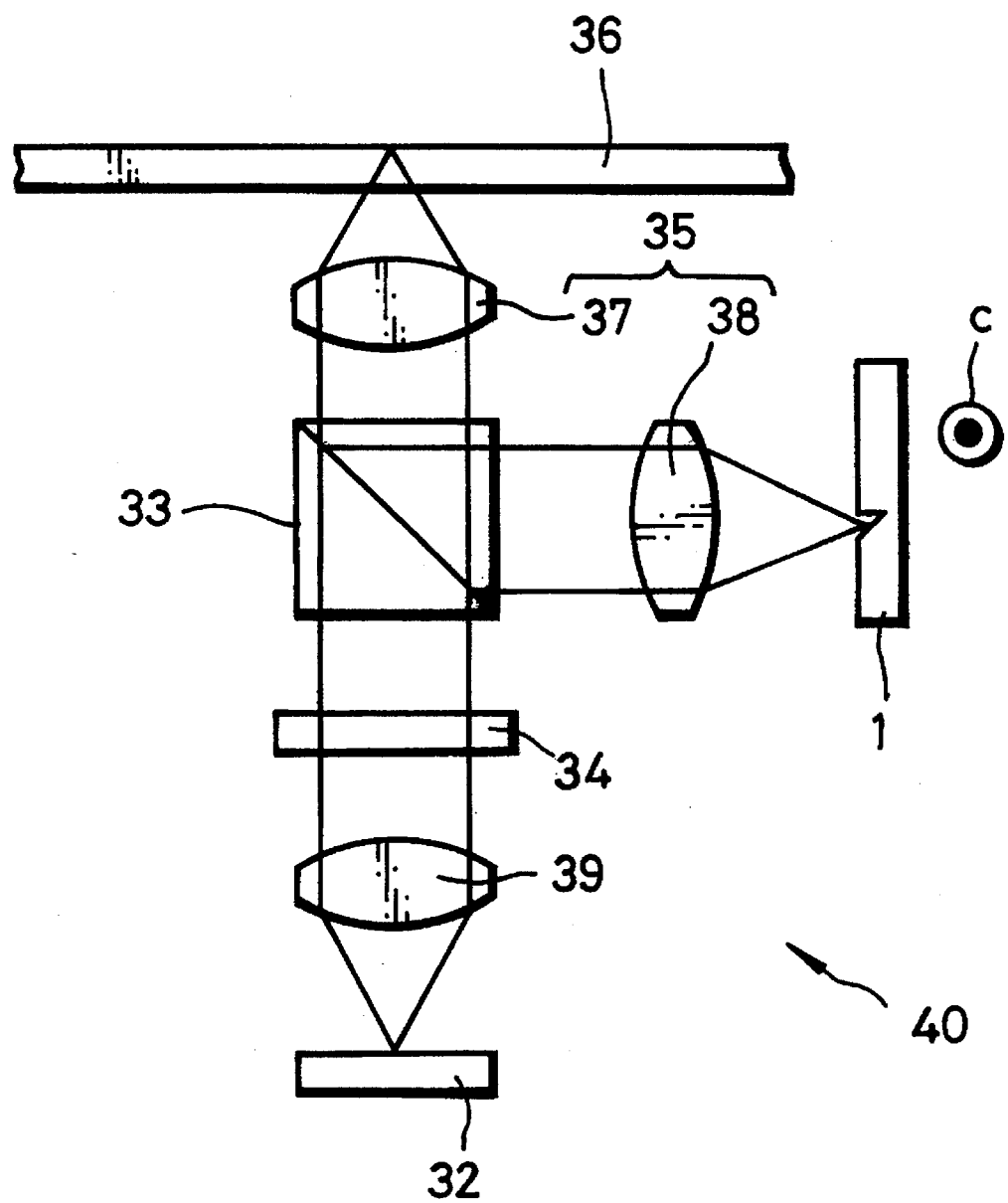
FIG. 10 is a schematic diagram showing an arrangement of an optical device according to a first embodiment of the present invention.

FIG. 10 shows an optical device according to a first embodiment of the present invention.

According to this embodiment, as shown in FIG. 10, an optical device 40 comprises an optical element 1 of an integrated structure in which a light-emitting portion 4 and a light receiving portion 5 are closely disposed on a common substrate 6 and the other light receiving element, e.g., a photodiode element 32, a beam splitter 33, a polarizing means 34 and a converging means 35. Light emitted from the light-emitting portion 4 on the optical element 1 is converged to and irradiated on a magneto-optical medium, e.g., magneto-optical disc 36 through the beam splitter 33. Reflected-back light reflected on the magneto-optical disc 36 is divided by the beam splitter 33. One divided reflected-back light is traveled through the same optical path as that of the emitted light and received by the light receiving portion 5 on the optical element 1. The other divided reflected-back light is passed through the polarizing means 34 and received by the other light receiving element 32.

The polarizing means 34 might be a polarizing plate having a polarization selective transmission characteristic.

The converging means 35 comprises a converging optical lens, i.e., an objective lens 37 opposed to the magneto-optical disc 36, a collimator lens 38 disposed between the optical element 1 and the beam splitter 33 and an optical lens 39 for converging the other reflected-back light on the light receiving element 32.

The optical element 1 is disposed in such a manner that the light-emitting portion 4 of the optical element 1 is placed at one focus position of the converging lens system composed of the objective lens 37 and the collimator lens 38. To be more concrete, the optical element 1 is disposed such that a so-called waist of light emitted from the semiconductor laser LD is placed at the confocal position. The magneto-optical disc 36 is placed at the other focus position of the above converging lens system.

The light receiving element 32 also is disposed at one focus position of the converging lens system composed of the objective lens 37 and the optical lens 39.

In accordance with the optical device 40 thus arranged, light emitted from the light-emitting portion 4 of the optical element 1 (i.e., emitted light having a polarization direction c perpendicular to the sheet of drawing of FIG. 10) is introduced through the collimator lens 38 into the beam splitter 33, wherein it is reflected, converged to and irradiated on the magneto-optical disc 36 through the objective lens 37. A plane of polarization of light irradiated on the magneto-optical disc 36 is rotated by Kerr effect corresponding to recorded information, and reflected-back light reflected on the magneto-optical disc 36 is introduced into to and divided by the beam splitter 33. One reflected-back light reflected by the beam splitter 33 is traveled through the same optical path as that of the emitted light and received by the light receiving portion 5 disposed near the confocal position on the optical element 1. The other reflected-back light passed through the beam splitter 33 is traveled through the polarizing means 34 and the optical lens 39 and received by the light receiving element 32.

Since the reflected-back light from the magneto-optical disc 36 is the signal representing the change of the direction of polarization as described above, if the direction of polarization of the polarizing means 34 is inclined with a predetermined angle relative to the reflected-back light, then intensity of light received by the light receiving means is changed in response to the signal, thereby making it possible to detect a magneto-optical signal.

In the optical device 40 according to the embodiment of the present invention, since the other reflected-back light passed through the beam splitter 33 is received by the light receiving element 32 through the polarizing means 34, the light receiving element 32 can detect the magneto-optical signal, i.e., an RF (high frequency) signal that is a reproduced output corresponding to information supplied from the magneto-optical disc 36. The light receiving portion 5 of the optical element 1 is composed of a plurality of, for example, four divided photodiodes PD. The light receiving portion 5 receives one reflected-back light reflected by the beam splitter 33 to thereby detect a servo signal, such as a focusing servo signal, a tracking servo signal or the like.

According to the above-mentioned optical device 40, since the optical device 40 uses the optical element 1 in which the light-emitting portion 4 and the light receiving portion 5 are monolithically integrated on the common substrate 6 with a close positional relationship, the number of optical parts of the optical device 40 can be reduced. Therefore, it is possible to simplify and miniaturize the overall arrangement of the optical device 40.

In the case of a magneto-optical pickup in which optical parts are assembled in a hybrid fashion, it is impossible to place the light receiving element at the confocal position of the converging lens with high alignment accuracy. On the other hand, according to this embodiment, since the optical device 40 employs the optical element 1, it is possible to dispose the light receiving portion 5 at the position near the confocal position of the converging means in the order of 1 μ. Therefore, it is possible to provide a miniaturized magneto-optical pickup with high positional accuracy.

Further, since the light receiving portion 5 on the optical element 1 detects the servo signal, the light receiving element 32 that detects the RF signal need not be divided, which does not require high alignment accuracy.

Specifically, the servo signal is formed of calculated results (sum of or difference between intensities of light rays incident on one photodiode and the other photodiode) obtained when spatial distribution of intensity of light brought by the change of shape or the change of size of beam spot of light incident on the photodiode is calculated by the separation of photodiodes. Accordingly, the center at which the photodiode is divided and the optical axis have to be agreed with each other with accurate alignment.

On the other hand, since the RF signal in the magneto-optical recording is obtained by calculating the change of the direction of polarization of the reflected-back light with time. it is possible to obtain the RF signal by using a photodiode with sensitivity in the direction of polarization or by disposing a polarizing plate whose transmission characteristic changes with the direction of polarization in front of the photodiode which receives the RF signal. Therefore, the photodiode need not be divided. In this case, if a photodiode larger than a diameter of a beam spot is used, then the photodiode can be set in substantially the alignment free condition.

In the optical system of commercially available optical pickups, a photodiode for generating a servo signal and a photodiode for generating an RF signal are the same so that a sum of signal strengths from the divided photodiodes is used as the RF signal.

Since the most specific feature of the optical element 1 lies in that a light-emitting point and the center of the spot of the reflected light are completely agreed with each other, if the divided photodiodes PD forming the light receiving element 5 are disposed around the center of the spot of the reflected-back light on the optical element 1, there is then the advantage that the servo signal can be detected by the optical system which is placed in the so-called alignment free state. Further, if the light receiving element 32 for obtaining the RF signal is used exclusively, then it is possible to maximize and enhance the optical element 1 when necessary.

In FIG. 10, if the polarizing means 39 is provided on the optical element 1 side, then it is possible to detect the RF signal by the light receiving portion 5 on the optical element 1. Also, it is possible to detect the servo signal by the light receiving element 32.

Figure 11:
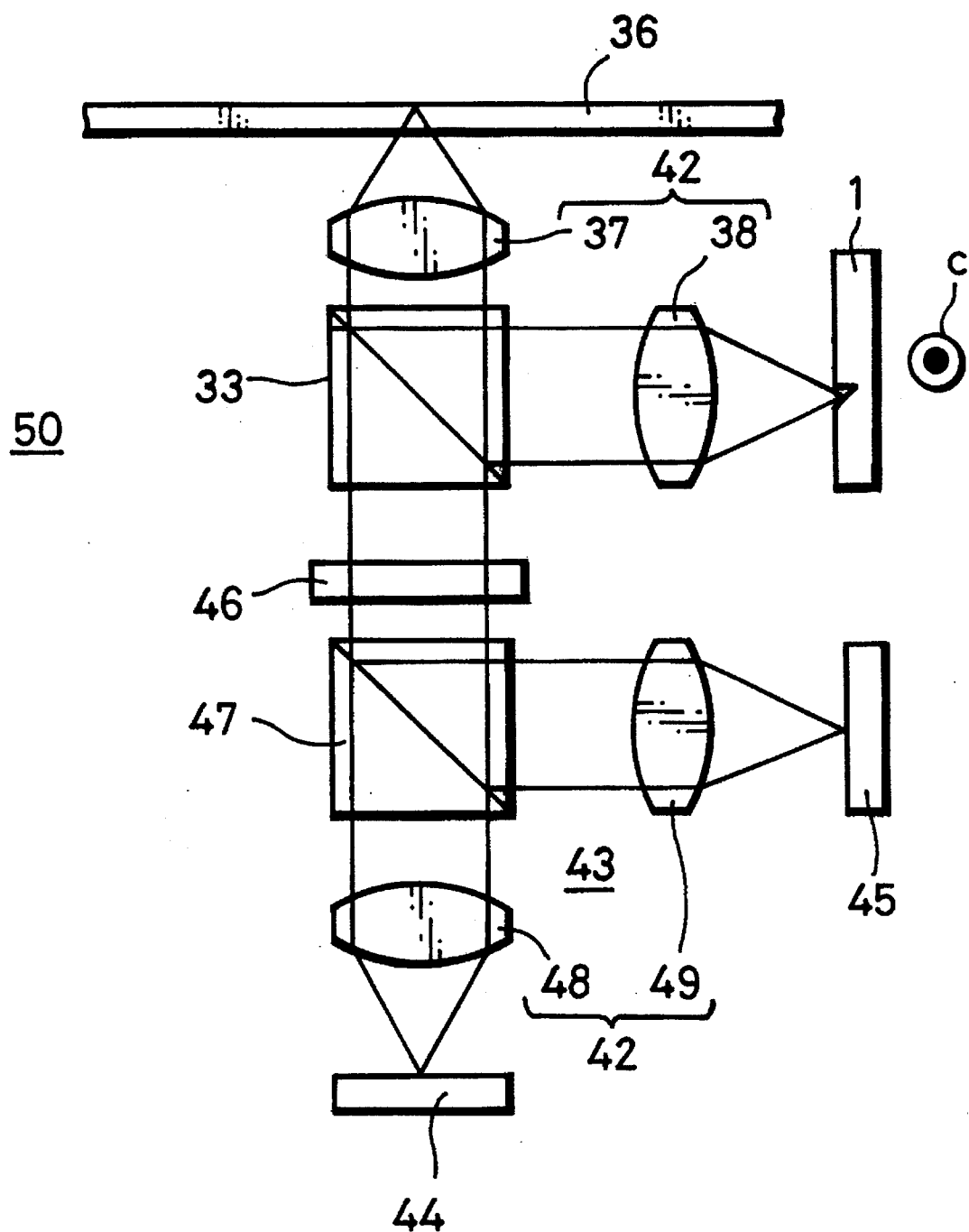
FIG. 11 is a schematic diagram showing an arrangement of an optical device according to a second embodiment of the present invention.

FIG. 11 shows an optical device according to a second embodiment of the present invention. The optical device according to this embodiment employs a differential configuration to remove an influence exerted by a fluctuation of intensity of light when the RF signal is detected. In FIG. 11, like parts corresponding to those of FIG. 10 are marked with the same references.

According to this embodiment, as shown in FIG. 11, the optical device 50 comprises the optical element 1 of the integrated structure in which the light-emitting portion 4 and the light receiving portion 5 are closely disposed on the common substrate 6, the beam splitter 33, a converging means 42, first and second light receiving elements, i.e., photodiode elements 44, 45 constructing a differential structure 43, a half-wave plate 46 and a polarizing beam splitter 47. Light emitted from the light-emitting portion 4 on the optical element 1 is converged to and irradiated on the magneto-optical disc 36 serving as a magneto-optical medium through the beam splitter 33. Reflected-back light reflected on the magneto-optical disc 36 is divided by the beam splitter 33. One divided reflected-back light is traveled through the same optical path as that of the emitted light and received by the light receiving portion 5 on the optical element 1. The other divided reflected-back light is traveled through the half-wave plate 46 and divided by the polarizing beam splitter 47. Then, first divided light is received by the first light receiving element 44 and second divided light is received by the second light receiving element 45, respectively.

The converging means 42 comprises the objective lens 37 opposed to the magneto-optical disc 36, the collimator lens 38 disposed between the optical element 1 and the beam splitter 33 and optical lenses 48, 49 for converging the first divided light and the second divided light of the reflected-back light on the first and second light receiving elements 44 and 45.

Similarly as described before, the optical element 1 is disposed such that the waist of light emitted from the light-emitting portion, i.e., the semiconductor laser LD is disposed at the focus position of the converging lens system composed of the objective lens 37 and the collimator lens 38. The magneto-optical disc 36 is placed at the other focus position of the converging lens system.

The first and second light receiving elements 44 and 45 also are disposed at a focus position of the converging lens system composed of the objective lens 37 and the optical lens 48 and at a focus position of the converging lens system composed of the objective lens 37 and the optical lens 49, respectively.

In the optical device 50 thus arranged, light emitted from the light-emitting portion 4 of the optical element 1 is introduced through the collimator lens 38 to the beam splitter 33, wherein it is reflected, converged to and irradiated on the magneto-optical disc 36 through the objective lens 37. A plane of polarization of light irradiated on the magneto-optical disc 36 is rotated by Kerr effect corresponding to recorded information. Reflected-back light reflected on the magneto-optical disc 36 is introduced into and divided by the beam splitter 33.

One reflected-back light reflected by the beam splitter 33 is passed through the same optical path as that of the emitted light and received by the receiving portion 5 disposed near the confocal position on the optical device 1. The light receiving portion 5 includes four divided photodiodes PD similarly as described before and can detect the servo signal by receiving one reflected-back light.

The other reflected-back light passed through the beam splitter 33 is introduced through the half-wave plate 46 to the polarizing beam splitter 47, in which it is further divided. When the other reflected-back light passes the half-wave plate 46, the polarization direction (i.e., vibration axis of light) of the reflected-back light is rotated by 45°. First divided light passed through the polarizing beam splitter 47 is received by the light receiving element 44 through the optical lens 48. Second divided light reflected by the polarizing beam splitter 47 is received by the second light receiving element 45 through an optical lens 49.

A polarization direction of light is rotated by 45° by the half-wave plate 46 and this light is introduced into the polarizing beam splitter 47, whereby the reflected-back light is divided by an equal light amount. Thus, the first and second light receiving elements 44 and 45 receive light rays of equal intensity of light.

If detected signals from the first and second light receiving elements 44 and 45 are supplied to a differential amplifier (not shown) and a difference therebetween is calculated by the differential amplifier, then it is possible to obtain a magneto-optical signal (RF signal) from which there is removed a noise concerning intensity of light.

According to the above-mentioned optical device 50, since the optical device 50 includes the optical element 1, similarly as described above, it is possible to reduce the number of optical parts, to simplify and miniaturize the overall arrangement of the optical device. Further, since the optical element 1 is used, the light receiving portion 5 can be placed at the position near the confocal in the order of 1 µm. Therefore, it is possible to obtain a miniaturized magneto-optical pickup with high positional accuracy.

Furthermore, according to this embodiment, since the magneto-optical signal is detected by the differential configuration in a differential fashion, an influence exerted by the fluctuation of intensity of light can be removed and it is possible to detect the magneto-optical signal with high S/N.

Figure 12:
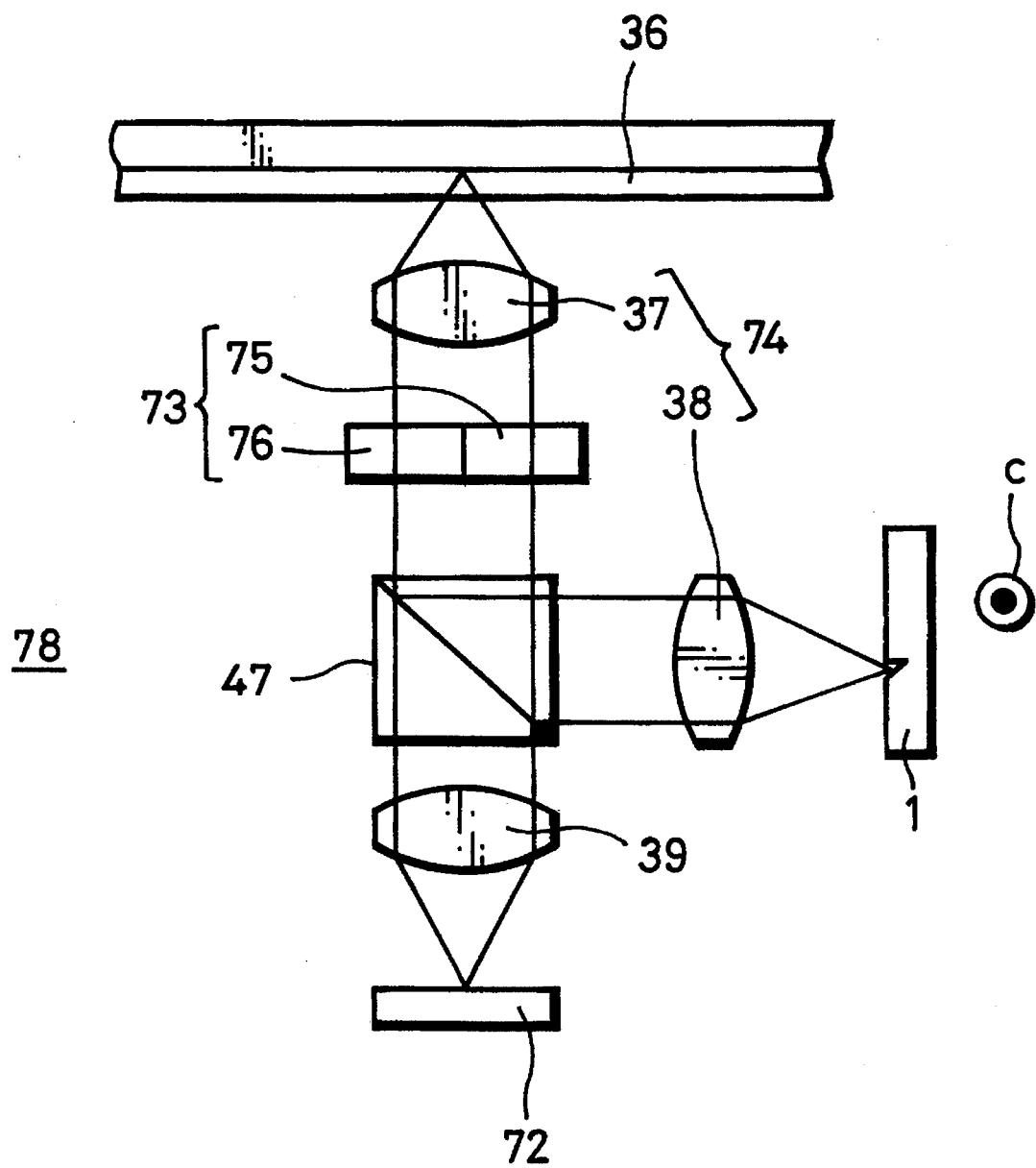
FIG. 12 is a schematic diagram showing an arrangement of an optical device according to a third embodiment of the present invention.

FIG. 12 shows an optical device according to a third embodiment of the present invention. In FIG. 12, like parts corresponding to those of FIG. 11 are marked with the same references.

According to this embodiment, as shown in FIG. 12, an optical device 78 comprises the optical element 1 of the integrated structure in which the light-emitting portion 4 and the light receiving portion 5 are closely disposed on the common substrate 6, one light receiving element, e.g., a photodiode element 72, the polarizing beam splitter 47 serving as the polarizing means, an optical rotating plate 73 serving as a polarizing means for rotating a polarization direction by h predetermined angle, i.e., 45° in this embodiment when outward light and inward light are passed therethrough, and a converging means 74. Light emitted from the light-emitting portion 4 on the optical element 1 is directly introduced into the polarizing beam splitter 47, traveled through the optical rotating plate 73 and converged to and irradiated on the magneto-optical disc 36. Reflected-back light reflected on the magneto-optical disc 36 is passed through the optical rotating plate 73 one more time and divided by the polarizing beam splitter 47. One divided reflected-back light is received by the light receiving portion 5 on the optical element 1, and the other divided reflected-back light is received by the light receiving element 72.

The optical rotating plate 73 is composed of a right optical rotating plate 75 and a left optical rotating plate 76 so as to be divided by half in the optical path. Outward light (i.e., emitted light traveling toward the magneto-optical disc 36) is passed through the right optical rotating plate 75, and inward light (i.e., reflected-back light reflected on the magneto-optical disc 36) is passed through the left optical rotating plate 76.

Therefore, the outward light and the inward light are rotated in the same direction. The thickness of the optical rotating plate 73 is selected such that, when light passes the optical rotating plate 73 twice, the polarization direction of light can be rotated by a predetermined angle, i.e., 45° in this embodiment.

The converging means 74 comprises the objective lens 37 opposed to the magneto-optical disc 36, the collimator lens 38 disposed between the optical element 1 and the polarizing beam splitter 47 and the optical lens 39 for converging the reflected-back light on the light receiving element 72.

Similarly as described before, the optical element 1 is disposed such that the waist of light emitted from the light-emitting portion, i.e., the semiconductor laser LD is placed at the focus position of the converging lens system composed of the objective lens 37 and the collimator lens 38. The magneto-optical disc 36 is disposed at the other focus position of the above converging lens system.

The light receiving element 72 also is disposed at one focus position of a converging lens system composed of the objective lens 37 and the optical lens 39.

The light receiving portion 5 of the optical element 1, the light receiving element 72, the polarizing beam splitter 47, the optical rotating plate 73 and a differential amplifier (not shown) constitute a so-called differential structure.

According to the optical device 78 thus arranged, light emitted from the light-emitting portion 4 of the optical element 1 is traveled through the collimator lens 38 and directly introduced into the polarizing beam splitter 47, wherein it is reflected and passed through the right optical rotating plate 75 of the optical rotating plate 73, thereby converged to and irradiated on the magneto-optical disc 36 through the objective lens 37. A polarization plane of the light irradiated on the magneto-optical disc 36 is rotated by Kerr effect corresponding to recorded information. Reflected-back light reflected on the magneto-optical disc 36 is traveled through the left optical rotating plate 76 of the optical rotating plate 73 and introduced into the polarizing beam splitter 47.

At that very time, light is traveled through the right optical rotating plate 75 and the left optical rotating plate 76 so that the polarization direction of light is rotated by 45°.

Reflected-back light is divided by the polarizing beam splitter 47. One reflected-back light reflected on the polarizing beam splitter 47 is received by the light receiving portion 5 on the optical element 1. The other reflected-back light passed through the polarizing beam splitter 47 is received by the light receiving element 72.

Since the polarization direction of light is rotated by 45° after the light was traveled through the optical rotating plate 73 twice and then the light is introduced into the polarizing beam splitter 47, the reflected-back light is divided by the equal light amount and therefore an amount of light received by the light receiving portion 5 of the optical element 1 and an amount of light received the light receiving element 72 become equal to each other.

When detected signals from the light receiving portion 5 of the optical element 1 and the light receiving element 72 are supplied to the differential amplifier (not shown) and a difference therebetween is calculated by the differential amplifier, it is possible to obtain a magneto-optical signal (RF signal) from which there is eliminated a noise concerning intensity of light.

If the light receiving portion 5 of the optical element 1 is composed of a plurality of divided photodiodes PD, then it is possible to detect a servo signal by the light receiving portion 5.

According to the optical device 78, since the optical device 78 includes the optical element 1, it is possible to reduce the number of optical parts. Therefore, the overall arrangement of the optical device can be simplified and miniaturized. Further, it is possible to provide a miniaturized magneto-optical pickup with high positional accuracy.

Furthermore, according to this embodiment, since the magneto-optical signal is detected by the differential configuration composed of the light receiving portion 5 of the optical element 1 and the light receiving element 72 in a differential fashion, the influence exerted by the fluctuation of intensity of light can be removed. Therefore, it is possible to detect a magneto-optical signal with high S/N.

As set out above, according to the optical device of the present invention, the number of the optical parts can be reduced, the arrangement of the optical device can be simplified with high positional accuracy and the whole of the optical device can be miniaturized. Therefore, as the magneto-optical pickup device for recording and reproducing the magneto-optical medium, such as a magneto-optical disc or the like, it is possible to realize an inexpensive miniaturized magneto-optical pickup device with high positional accuracy.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical device for detecting a magneto-optical signal comprising:

an optical element having a common substrate, a light-emitting portion and a light receiving portion, said light-emitting portion and said light receiving portion being closely disposed on said common substrate and said light receiving portion receiving and detecting reflected-back light in a single beam obtained from a magneto-optical medium after light emitted from said light-emitting portion was reflected on said magneto-optical medium; and another light receiving element, wherein said single beam of reflected-back light from said magneto-optical medium is divided into two beams, one reflected-back light beam is received and detected by said light receiving portion of said optical element and the other reflected-back light beam is received and detected by said another light receiving element.

2. An optical device according to claim 1, wherein said the other reflected-back light is received and a magneto-optical signal is detected by a differential amplifier using said another light receiving element in a differential fashion.

3. An optical device according to claim 1, further comprising polarizing means composed of a left optical rotating plate and a right optical rotating plate and wherein said emitted light is traveled through one optical rotating plate and irradiated on said magneto-optical medium, said reflected-back light from said magneto-optical medium is traveled through the other optical rotating plate, reflected-back lights divided by half are received by said light receiving portion of said optical element and said another light receiving element, and a magneto-optical signal is detected by a differential structure composed of said light receiving portion of said optical element and said another light receiving element in a differential fashion.

* * * * *